United States Patent
Waugh et al.

(10) Patent No.: US 6,678,821 B1
(45) Date of Patent: Jan. 13, 2004

(54) METHOD AND SYSTEM FOR RESTRICTING ACCESS TO THE PRIVATE KEY OF A USER IN A PUBLIC KEY INFRASTRUCTURE

(75) Inventors: Donald Craig Waugh, Oakville (CA); Michael Albert Roberts, Thornhill (CA); Rahim Alibhai, North York (CA)

(73) Assignee: E-Witness Inc., Toronto (CA)

( * ) Notice: Subject to any disclaimer, the term of this patent is extended or adjusted under 35 U.S.C. 154(b) by 0 days.

(21) Appl. No.: 09/533,596

(22) Filed: Mar. 23, 2000

(51) Int. Cl.⁷ .............................. G06F 17/60; H04L 9/08
(52) U.S. Cl. .................. 713/168; 713/155; 713/156; 713/168; 713/171; 713/182; 713/201; 308/30; 308/277; 308/278; 308/282; 308/283
(58) Field of Search ................................ 713/201, 155, 713/156, 168, 171, 186; 380/277, 278, 282, 283, 30

(56) References Cited

U.S. PATENT DOCUMENTS

| | | | |
|---|---|---|---|
| 5,003,405 A | 3/1991 | Wulforst | |
| 5,136,647 A | 8/1992 | Haber et al. | |
| 5,343,529 A | 8/1994 | Goldfine et al. | |
| 5,345,506 A | 9/1994 | Tsubakiyama | |
| 5,410,693 A | 4/1995 | Yu et al. | |
| RE34,954 E | 5/1995 | Haber et al. | |
| 5,500,513 A | 3/1996 | Langhans et al. | |
| 5,559,888 A | 9/1996 | Jain et al. | |
| 5,615,268 A | 3/1997 | Bisbee et al. | |
| 5,649,185 A | 7/1997 | Antognini et al. | |
| 5,671,282 A | 9/1997 | Wolff et al. | |
| 5,680,460 A | 10/1997 | Tomko et al. | |
| 5,699,427 A | 12/1997 | Chow | |
| 5,715,454 A | 2/1998 | Smith | |
| 5,748,738 A | 5/1998 | Bisbee et al. | |
| 5,758,069 A | 5/1998 | Olsen | |
| 5,758,358 A | 5/1998 | Ebbo | |
| 5,781,629 A | 7/1998 | Haber et al. | |
| 5,802,299 A | 9/1998 | Logan et al. | |
| 5,832,091 A | 11/1998 | Tomko et al. | |
| 5,872,848 A | 2/1999 | Romney et al. | |
| 5,887,133 A | 3/1999 | Brown et al. | |
| 5,890,177 A | 3/1999 | Moody et al. | |
| 5,897,643 A | 4/1999 | Matsumoto | |

(List continued on next page.)

FOREIGN PATENT DOCUMENTS

| | | |
|---|---|---|
| EP | 0 461 059 | 12/1991 |
| EP | 0 789 361 | 8/1997 |

(List continued on next page.)

OTHER PUBLICATIONS

Irish Times, New Internet browser has 128–bit encryption security, Sep. 25, 1998, p. 61.*

(List continued on next page.)

Primary Examiner—Ayaz Sheikh
Assistant Examiner—Taghi T. Arani
(74) Attorney, Agent, or Firm—Eugene J. A. Gierczak; Miller Thomson LLP

(57) ABSTRACT

An encryption/decryption system for providing restricted use of each key in a plurality of keys to preserve confidentiality of the plurality of keys. Each key is usable by an associated user in a public key infrastructure to encrypt and decrypt data. The encryption/decryption system comprises a key storage means for storing a plurality of keys, user authentication means for determining whether a prospective user of a key in the plurality of keys is the associated user of the key, and an encryption/decryption means for encrypting and decrypting data using the plurality of keys when the user authentication means authenticates the prospective user. The encryption/decryption means is operable in a browser on a client computer.

31 Claims, 6 Drawing Sheets

U.S. PATENT DOCUMENTS

| | | | |
|---|---|---|---|
| 5,898,836 A | | 4/1999 | Freivald et al. |
| 5,937,159 A | | 8/1999 | Meyers et al. |
| 5,948,057 A | | 9/1999 | Berger et al. |
| 5,991,876 A | | 11/1999 | Johnson et al. |
| 5,995,939 A | | 11/1999 | Berman et al. |
| 6,105,012 A | * | 8/2000 | Chang et al. ............... 705/64 |

FOREIGN PATENT DOCUMENTS

| | | |
|---|---|---|
| EP | 0 798 619 | 10/1997 |
| EP | 0859 488 | 8/1998 |
| JP | 08137938 | 5/1996 |
| WO | WO 98/02968 | 1/1998 |
| WO | WO 99/53408 | 10/1999 |

OTHER PUBLICATIONS

Introduction to SSL, Netscape Communications Corporationhttp, 1998, downloaded from http//developer.netscape.com/tech/security/ssl/howitworks.html.*

How SSL Works, Ntscape communications Corporation, 1999, downloaded from http://developer.netscape.com/docs/manuals/security/sslin/contents.htm.*

* cited by examiner

US 6,678,821 B1

METHOD AND SYSTEM FOR RESTRICTING ACCESS TO THE PRIVATE KEY OF A USER IN A PUBLIC KEY INFRASTRUCTURE

FIELD OF THE INVENTION

This invention relates in general to public key infrastructure, and more particularly relates to controlling use of the private key of a user in a public key infrastructure

BACKGROUND OF THE INVENTION

Distributed computing environments are becoming increasingly ubiquitous. Perhaps the best known distributed computing environment is the Internet, which is a worldwide system of interconnected computer networks. Each of these computer networks may itself include a group of interconnected computers, together with the hardware and software required to connect them. These computers include client computers and server computers. A server is a computer that makes information and services available. A client is a computer that downloads, uploads or otherwise exchanges information and services from the server using a browser. A browser is a client program that allows users to read hypertext documents on the Internet, and to navigate between different hypertext documents.

Electronic mail provides an efficient means of data exchange in distributed computing environments. Data is also exchanged through visitors to web sites completing web forms and directly entering information into databases. This data exchange is vulnerable to being intercepted by unauthorized third parties. Further, this risk is increased where, as in the case of the Internet, the public has substantially unrestricted access to the distributed computing environment.

To preserve confidentiality in the event of interception, data may be encrypted. One means of encrypting messages that has been widely adopted is public key infrastructure (PKI). In order to preserve, the confidentiality of a transmission between two parties using this encryption method, both parties must have secret or private keys that are used to encrypt each message. In this method, both the information sender and the information recipient have a pair of keys, one of which is private key that the party keeps secret, and the other of which is a public key that the party makes available to others. The encryption method is asymmetric: if a user's public key was used to encrypt a message, then the user's private key must be used to decrypt the message. In other words, only the recipient can decrypt a message that was encrypted using the recipient's public key, as the recipient's private key is required to decrypt such a message.

By tradition, the "digital signature", calculated by computing the hash function of the message to be sent and then encrypting the digital signature using the private key of the sender, guarantees that the message originated from the sender. However, if someone other than the sender is able to encrypt messages using the private key, then messages encrypted using the private key may not have originated from the sender.

Much of the benefit of public key infrastructure is lost if adequate measures are not taken to preserve the secrecy of each user's private key. Many users simply store their private key on their client computers hard drive under a "private key" subdirectory. Other users store the private key on a disk which they take with them, but from which anyone else can readily download their private key. This behavior substantially reduces the integrity of the system, as it increases the risk that data will be intercepted by one who knows, or can find out, the private key required to decrypt or encrypt the data.

A further problem with encryption using conventional software is that it is not always available. Specifically, some electronic messaging systems do not provide for encryption. While documents can be encrypted before being attached to messages sent by such electronic messaging systems, this increases the number of steps required for encryption and decryption and, accordingly, reduces the likelihood that encryption will actually be used.

Accordingly, there is a need for a method and system of permitting encryption in a number of different electronic messaging, database entry, web form completion and other data exchange services, while restricting access to a private key so that only the actual user of that private key can use the key to encrypt or decrypt messages.

SUMMARY OF THE INVENTION

An aspect of one object of the present invention is to provide an improved encryption/decryption system.

In accordance with the aspect of the present invention is provided an encryption/decryption system for providing restricted use of each" key in a plurality of keys to preserve confidentiality of the plurality of keys. Each key is usable by an associated user in a public key infrastructure to encrypt and decrypt data. The encryption/decryption system comprises:

(a) A key storage means for storing a plurality of key;
(b) User authentication means for determining whether a prospective user of a key in a plurality of keys is the associated user of the key; and
(c) An encryption/decryption means for encrypting and decrypting data using the plurality of keys when the user authentication means authenticates the prospective user. The encryption/decryption means is operable in a browser on a client computer.

Preferably, for each key in the plurality of keys a biometric standard determined by measuring a selected feature of the associated user is stored in the key storage means. Further, the user authentication means comprises means for:

(i) Measuring the selecting feature of a prospective user;
(ii) Determining if the selected feature measured sufficiently correspond to the biometric standard;
(iii) Granting use of the key to the prospective user if the selected feature as measured sufficiently corresponds to the biometric standard; and
(iv) Denying use of the key to the prospective user if the selected feature as measured insufficiently corresponds to the biometric standard.

An object of a second aspect of the invention is to provide an improved computer program product for encryption/decryption.

In accordance with this second aspect of the present invention there is provided a computer program product for use on a computer system to provide restricted use of each key in a plurality of keys to preserve confidentiality of the plurality of keys. Each key is usable by an associated user in a public key infrastructure to encrypt and decrypt data. The computer program product comprises a recording medium and means recorder on the recording medium for instructing the computer system to perform the following steps:

(a) Storing a plurality of keys;
(b) Determining whether a prospective user of a key in a plurality of keys is the associated user for the key; and (c) If the prospective user of a key in the plurality of keys is the associated user for the key, then one of encryption and decryption data within a browser using the key.

Preferably, the computer program product further includes means for, for each key in a plurality of keys, storing a biometric standard determined by measuring a selected feature of the associated user. Further, step (b) preferably comprises (i) receiving a measured biometric value of the selected feature of a prospective user, and (ii) determining if the measured biometric value sufficiently corresponds to the biometric standard. Preferably, step (c) comprises (i) granting use of the key to the prospective us if the measured biometric value sufficiently corresponds to the biometric standard, and (ii) denying use of the key to the prospective user if the measured biometric value insufficiently corresponds to the biometric standard.

BRIEF DESCRIPTION OF THE DRAWINGS

Reference will now be made by way of example, to the accompanying drawings, which show preferred aspects of the present invention, and in which.

DETAILED DESCRIPTION OF PREFERRED ASPECTS OF THE INVENTION

Figure 1:
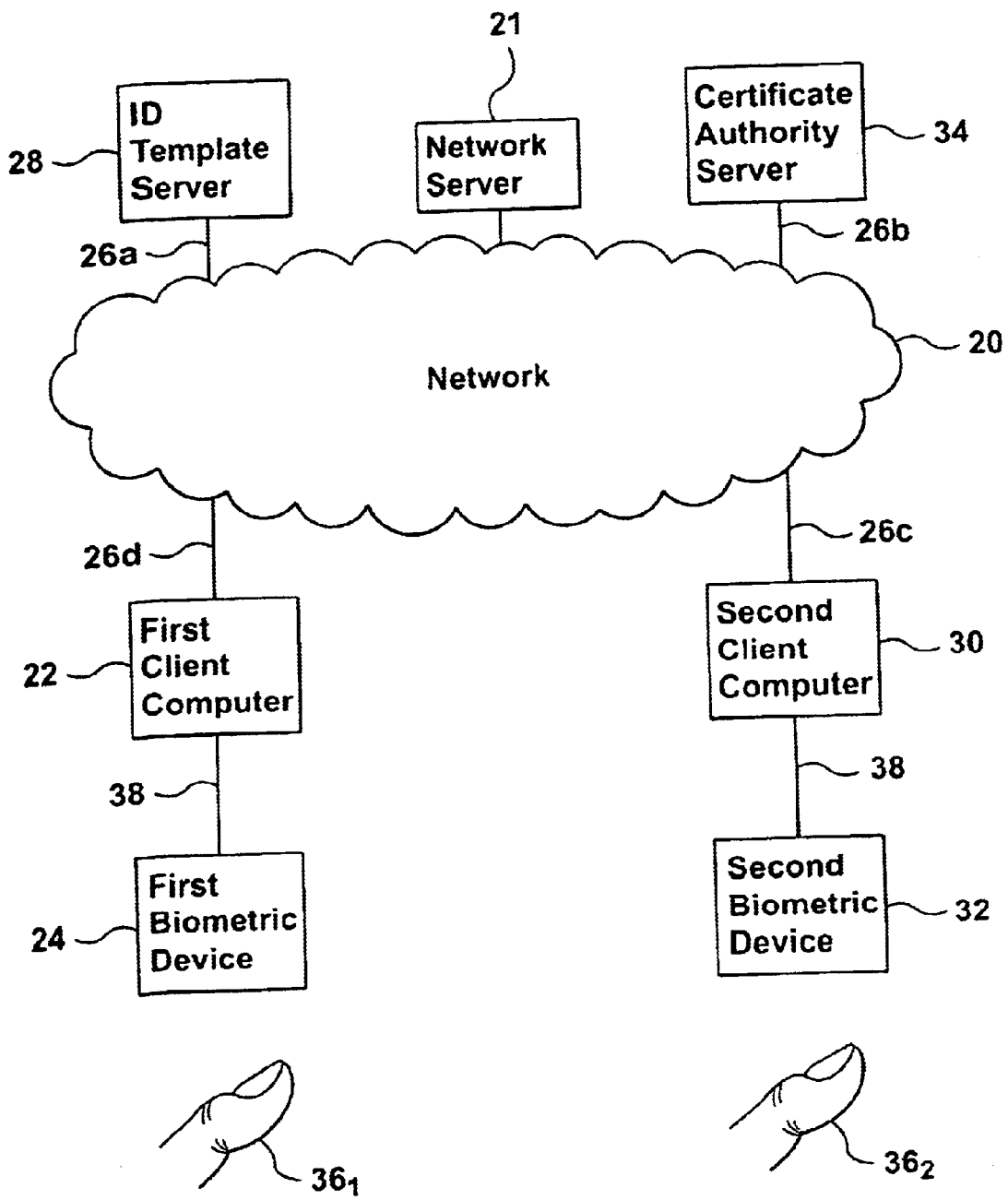
FIG. 1, in a block diagram, illustrates a distributed computing environment including two client computers that may be configured to implement an embodiment of the invention.

Referring to FIG. 1, there is illustrated a network including two client computers that may be configured to implement an embodiment of the invention. Specifically, network 20 includes a first client computer 22 and a second client computer 30. Client computer 22 is linked to a first biometric device 24 by a linking means 38, and is also linked to the remainder of the network 20 via a connection 26. Similarly, second client computer 30 is 20 linked to a second biometric device 32 by a linking means 38, and is linked to the remainder of the network by network connection 26. The network 20 also includes a network or application server 21 as well as an ID template server 28 and a certificate authority server 34 that are 25 accessible to client computers 22 and 30 via connection 26.

Figure 2:
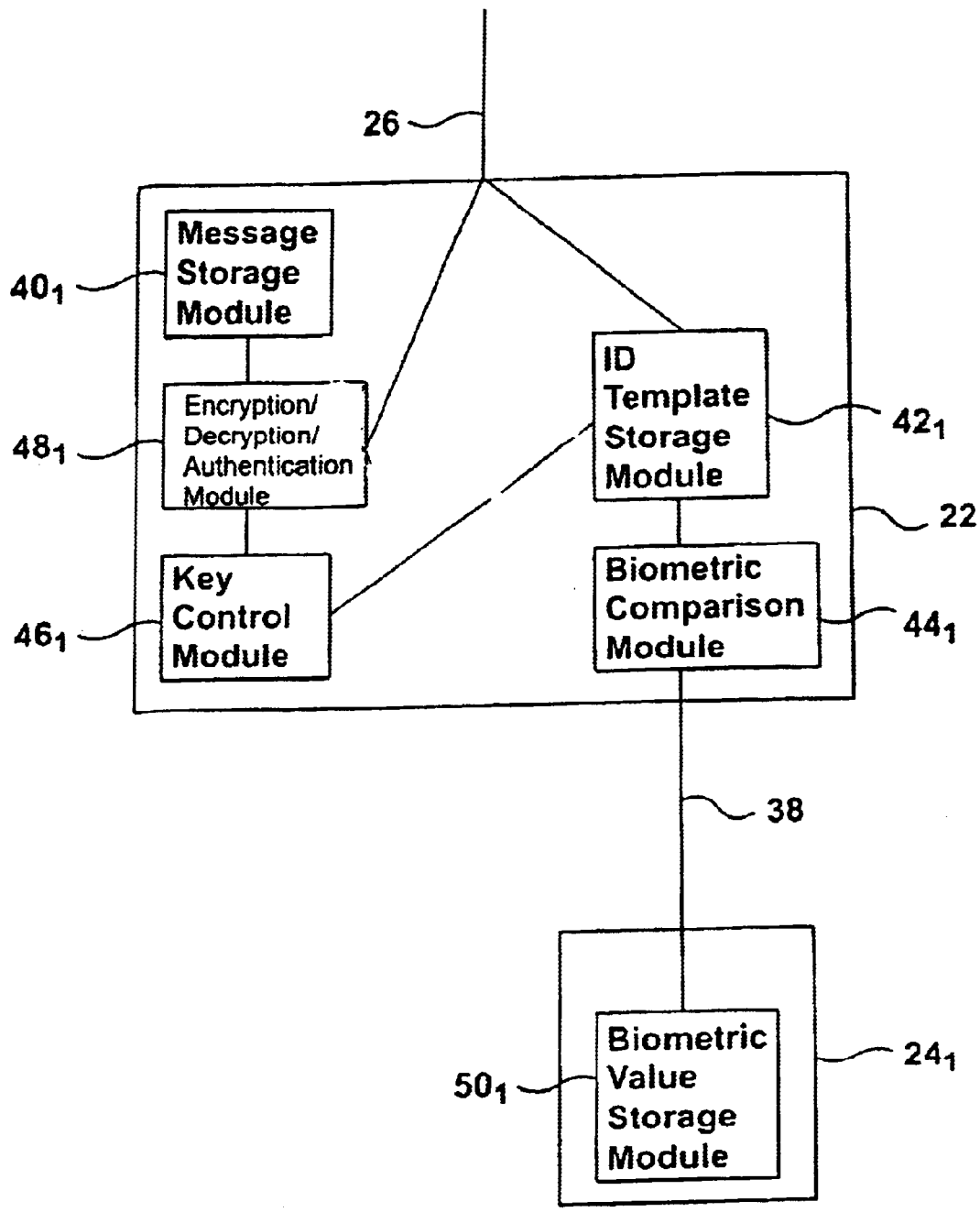
FIG. 2, in a block diagram, illustrates a first client computer of FIG. 1 as configured by browser software to implement a preferred, embodiment of the invention.

Each client computer comprises a processor (not shown), memory (not shown), and keyboard (not shown) or other suitable input device. Referring to FIG. 2, there is illustrated the first client computer 22 as configured by browser software to implement an embodiment of the invention. Thus configured, the client computer 22 includes a message storage module 40 for storing the message that is to be encrypted. The client computer 22 also includes an ID template storage module 42 for storing an ID template downloaded over the network connection 26 from the ID template server 28. Alternatively, ID templates may be stored directly on the client computers 22 and 30. An ID template 80 is illustrated in FIG. 3.

The ID template storage module 42 is linked to a biometric value comparison module 44, which, in turn, is linked by the linking means 38 to a measured biometric value storage module 301 in the biometric device 24. The ID template storage module 421 is also linked to a key control module 46, which, in turn, is linked to encryption/decryption module 48. The encryption/decryption module 48 is linked to the certificate authority server 34 via connection 26.

In the preferred embodiment, the ID template storage module 42, biometric value comparison module 44, key 20 control module 46, encryption/decryption module 48 and message storage module 40, are all embedded in a browser on the client computers 22 and 30. These modules may be an integral part of the browser software, or may be a plug-in for subsequent incorporation into the browser software. Making encryption and decryption a part of the browser has a number of advantages. First, it makes encryption possible even when the particular electronic message service available to a client computer does not, itself, permit encryption. Second, it facilitates the encryption itself. Specifically, a user may wish to send encrypted messages from a client computer that the user does not normally use. The user's private key will, in all probability, not be stored on the client computer. Even if he user's private key is stored on the client computer the public key owned by the intended recipient of the encrypted message will often not be stored on the client computer. Accordingly, the key must be made available by other means. One way of conveniently allowing use of both private and public keys is to store such keys on servers, such—as the ID template server 28 and the certificate authority server 34 respectively. Embedding encryption in the browser facilitates locating and downloading the private and public keys from the servers on which these keys are stored. A further advantage of making encryption and decryption a part of the browser arises from encryption being desirable in other network-based data exchanges, such as when a visitor to a web site enters information in a web form. Such information will sometimes include sensitive information, such as the user credit card number. It is the browser on the visitor's client computer that gains the visitor access to the web form. Accordingly, the visitor'browser is well situated to effect encryption and decryption of the data being entered into the form.

Figure 3:
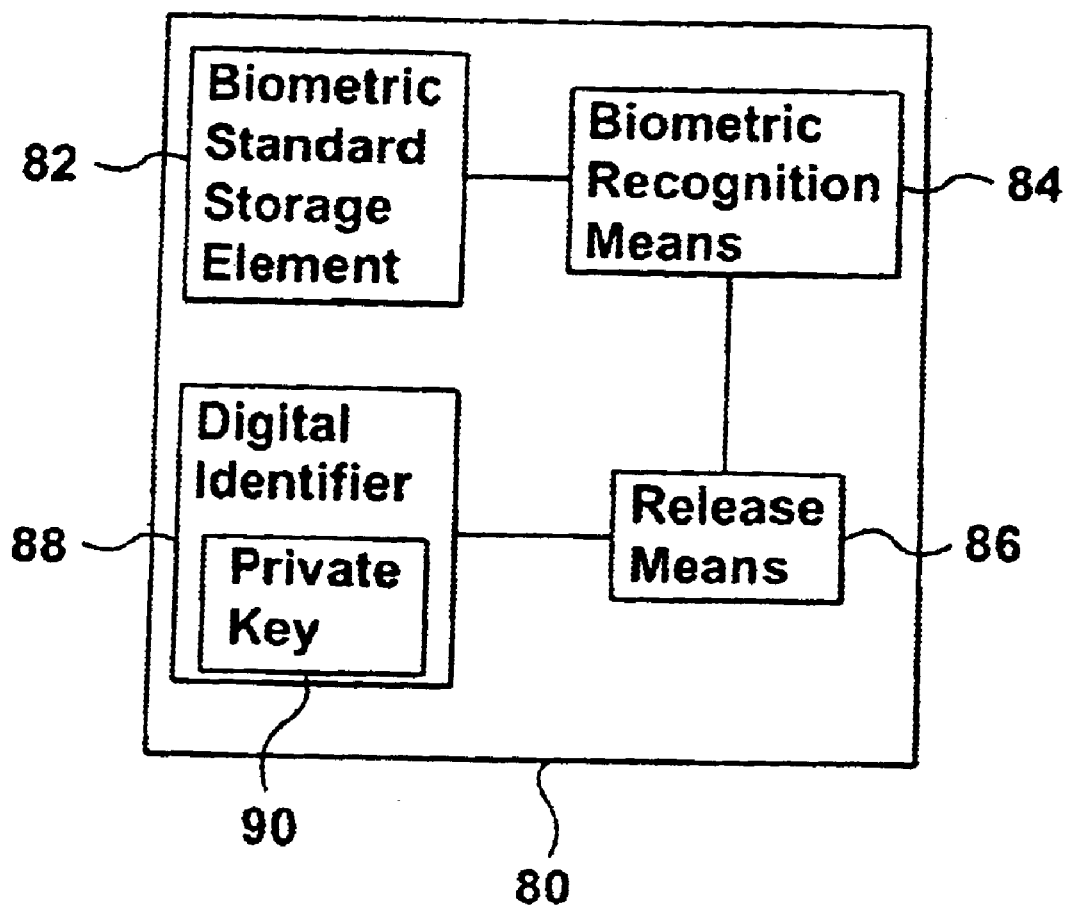
FIG. 3 illustrates an ID template in accordance with a preferred embodiment of the invention.

Referring to FIG. 3, there is illustrated an ID template 80 that is storable in the ID template server 28 and can be downloaded to the ID template storage module 42. The ID template 80 includes a biometric standard storage element 82, a biometric recognition means 84, a, digital identifier 88 and a release means 86 for releasing the digital identifier 88 when the biometric recognition means 84~ recognizes a biometric value that substantially corresponds to the biometric standard stored in the biometric standard storage element 82. As illustrated in FIG. 3, the biometric standard storage element 82 is linked to the biometric recognition means 84, which, in turn, is linked to the release means 86. The private key is embedded in the digital identifier 88 to enable the private key to be used without being seen or copied. When the digital identifier 88 is released, the key control module 46 decrypts the digital identifier using a control key to obtain the private key. The private key is then sent to the encryption/decryption module.

Figure 4:
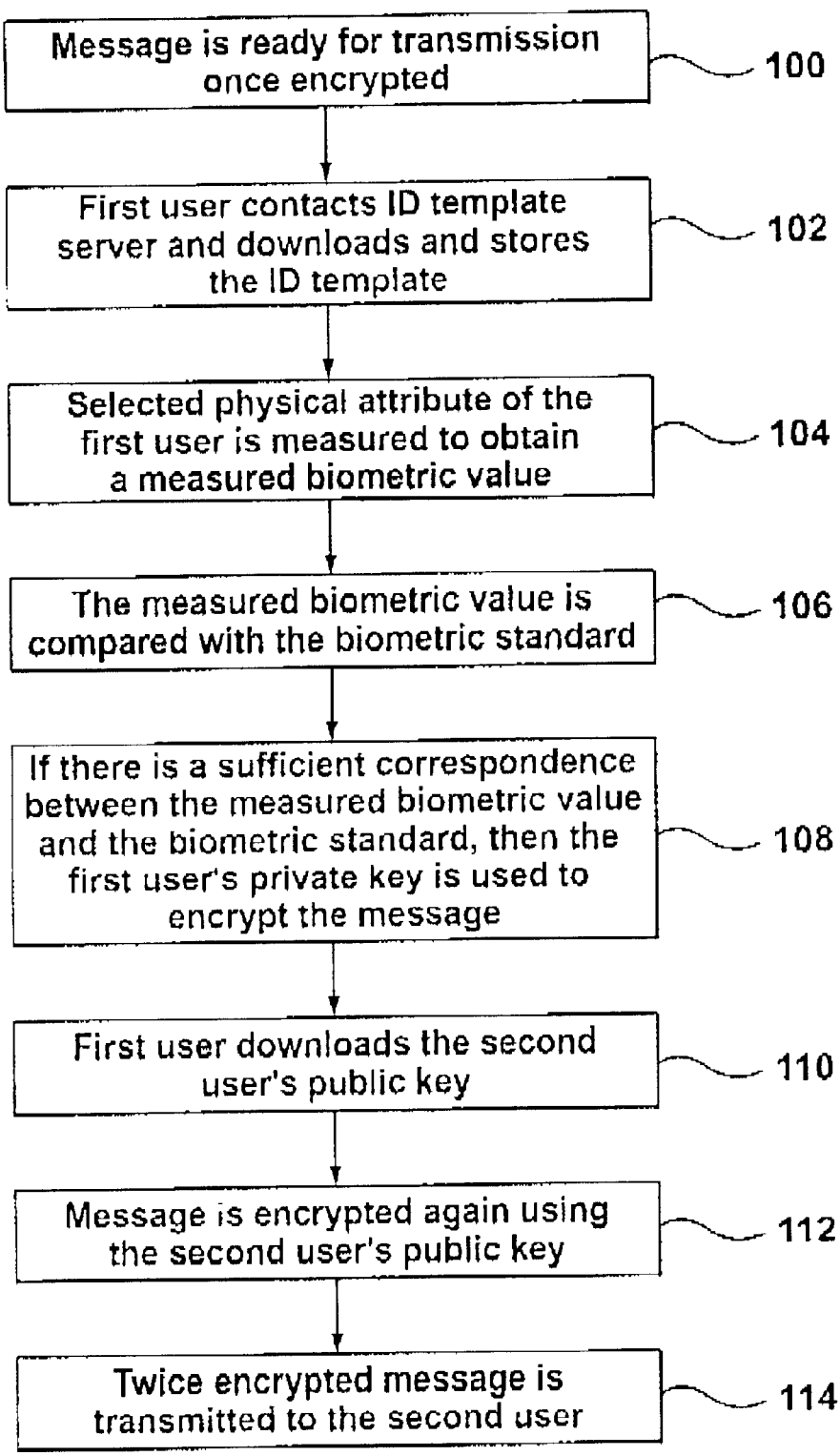
FIG. 4, in a flow chart, illustrates a method of encrypting and sending a message in accordance with a preferred aspect of the present invention.

Referring to FIG. 4, there is illustrated a preferred method of implementing the invention in the network 20 of FIG. 1. In step 100, a first user writes or Otherwise generates a message that is to be encrypted and sent to a second user. However, the first user does not know his own private key. In order to use his private key to encrypt the message stored in the message storage module 40, the user downloads his ID template 801 from the ID template server in step 102. This ID template 801 is then stored in the 10 template storage module 42. As discussed above the ID template 801 includes a biometric standard 82 and a digital identifier 84. The biometric standard 82 is a record of a previously measured physical attribute of the user. Typically, this physical attribute would be a finger print, but could also be some other physical attribute, such as a voice print of a voice.

In step 104, the same physical feature as is recorded in the biometric standard 82 is measured by a biometric device to obtain a measured biometric value. In the embodiment of FIG. 1, the first biometric device 24 reads the fingerprint from the finger 36 of the first user in step 104. Then, in step 106, the biometric value comparison module 44 compares the biometric standard 82 stored on the ID template storage module 42 with the measured biometric value obtained by the biometric device 24 and stored in the measured biometric value storage module 50g. If there is a sufficient correspondence between the two biometric values, then the biometric value comparison module 44 instructs the ID template storage module 421 to send the digital identifier 88 to the key control module 46. When the key control module 46 receives the digital identifier 88 from the ID template storage module 42, the key control module 46 decrypts the digital identifier to obtain the private key 90. The private key 90 is then provided to the encryption/decryption module 48. The encryption/decryption module 48 in step 108 then encrypts the message stored in message storage module 40 using the private key extracted from the digital identifier 84.

In the embodiment of FIG. 1, the message is being sent to a second user. Accordingly, before sending the message that has been encrypted using the first user's private key, the first user will contact the certificate authority server 34 and download, the second user's public key from the certificate authority 34 in step 1107. The message is then encrypted again by the encryption/decryption module 48 using the second user's public key in step 112. The twice encrypted message is then sent to the second user over the network 26 in step 114, or uploaded to a central message storage server.

According to this aspect of the invention, the private key is never viewed by anyone, including the user authorized to use the private key. Every time the user wishes to use the private key to encrypt or decrypt the message, the user must bio-authenticate using the biometric device 24. The private key is then used to encrypt the message without the user actually seeing the private key. Thus, the user cannot give the private key away, nor can the private key be determined by others.

Figure 5:
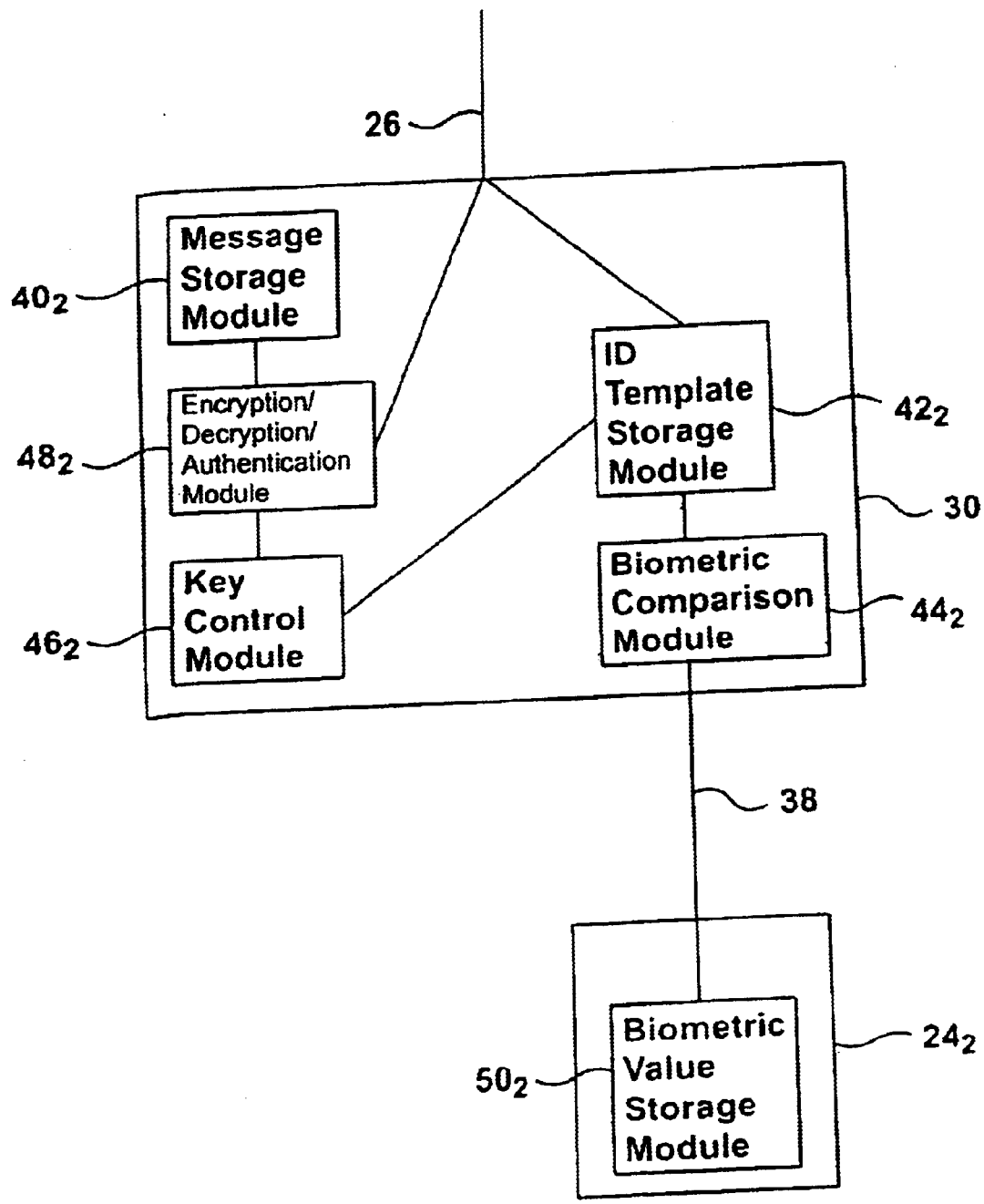
FIG. 5, in a block diagram, illustrates a second client computer of FIG. 1 as configured by browser software to implement a preferred embodiment of the invention; and, FIG. 6, in a flow chart, illustrates a method of decrypting a message in accordance with a preferred aspect of the present invention.

First client computer 22 configured as shown in FIG. 2 is also operable to recej2~e and decrypt encrypted messages, and to encrypt data entered into a web form or data for insertion into a database. Referring to FIG. 5, there is illustrated second client computer 30 as configured to implement an embodiment of the invention. The second client computer 30 configured as described below is operable to receive and decrypt encrypted messages. However, it will be appreciated by those skilled in the art that client computer 30 is also operable to encrypt and transmit messages, and to encrypt data entered into a web form or data for insertion into a database.

Second client computer 30, configured as shown in FIG. 5, is configured similarly to first client computer 22 configured as shown in FIG. 2. Specifically, thus configured, second client computer 30 includes a message storage module 40 for storing the message that is to be decrypted. Second client computer 30 also includes, an ID template storage module 42 for storing an ID template downloaded over the network connection 26 from the ID template server 28. The ID template storage module 422 is linked to a biometric value comparison module~which, in turn, is linked by the linking means 382 to a measured biometric value storage module 502 in the second biometric device 32. The ID template storage module 42 is also linked to a key control module 46, which, in turn, is linked to encryption/decryption module 48. The encryption/decryption module 48 is linked to the certificate authority server 34 via connection 26.

Figure 6:
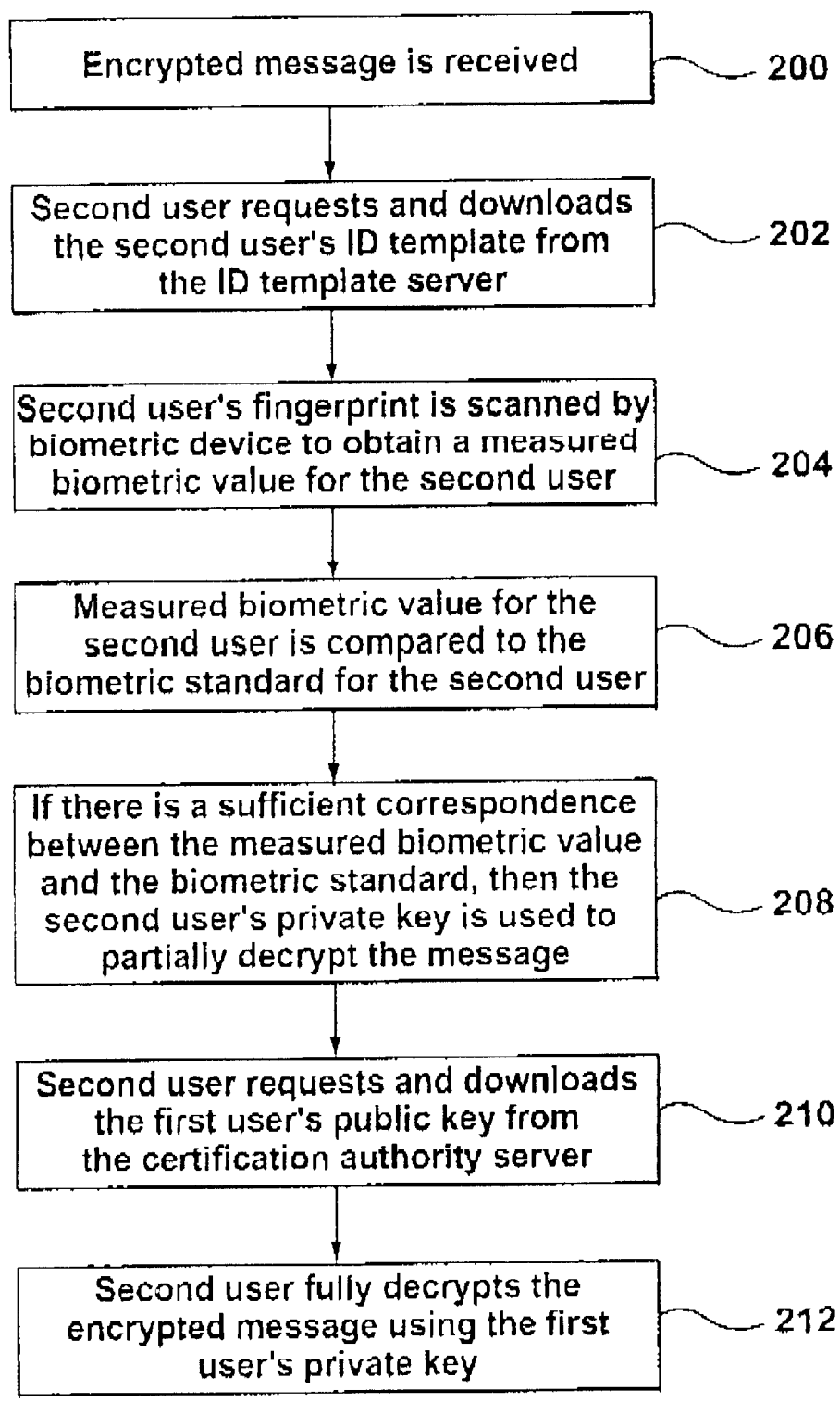

Referring to FIG. 6, there is illustrated a 5 preferred method of implementing a message reception and decryption aspect of the present invention. In step 200, a second user receives an encrypted message sent by the first user. As discussed above, the encrypted message has been encrypted using the first users private key and the second user's public key.

In step 202, the second user contacts the ID template server 28 from the second client computer 30 via connection 26c and 26a and network 20. The second user then downloads and stores an ID template 80 for the second user on ID template storage module 42 of second client computer 30. The ID template 80 for the second user has both the private key of the second user stored in a digital identifier 84 for the second user, and a biometric standard 82 of the fingerprint of the second user. In step 204, the same physical feature, in this case the fingerprint of the second user, that is recorded in the biometric standard 82 of the second user, is measured by a biometric device to obtain a measured biometric value for the second user. Then, in step 206, the biometric value comparison module 44 compares the biometric standard 82 stored on the ID template storage module 42 with the measured biometric value obtained by the biometric device 24. If there is a sufficient correspondence between the two biometric values, then the biometric value comparison module 44 instructs the ID template storage module 42 to send the digital identifier 88 to the key control module 46. The key control module 46 then decrypts the digital identifier 88 to obtain the second user's private key 90. The key control module 462 then provides the private key to the encryption module 48. The encryption module 48 then decrypts the message stored in the message storage module 40 using the second user's private key.

Once the message has been partially decrypted using the, second user's private key, the remainder of the decryption must be performed using the first user's public key. In step 210, the second user requests the first user's public key from the certification authority server 34 and downloads the first user's public key to the second client computer. Using The first user's public key, the second user fully decrypts the encrypted message in step 212; in other words, the second user decrypts that part of the encryption implemented using the first user's private key. If this decryption succeeds, then the second user will be satisfied that the message originated with the first user as the second user will know that the message was encrypted using the first user's private key, which private key can only be used on bio-authentication of the first user's fingerprint (or other selected feature).

The present invention may be embodied in other 25 specific forms without departing from the spirit or essential characteristics. Certain adaptations and modifications of the invention will be obvious to those skilled in the art. For example, instead of bio-authentication being used to authorize encryption/decryption in the browser, user name and password might be used. Further, encryption/decryption might be wholly limited to the client computer itself, or to a computer isolated from any network. The browser might then -be used to encrypt documents that are stored on the user's computer to preserve confidentiality. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An encryption/decryption authentication system for encrypting/decrypting data, authenticating data, and/or authenticating a sender, decrypting and/or verifying data or the sender for a recipient, the encryption/decryption/authentication system comprising:

(a) at least one key storage medium for storing a plurality of keys, each key being useable by an associated user in a public key infrastructure to encrypt and decrypt data; and (b) a computer accessible to the associated, linked to the at least one key storage medium, and further linked to an encryption/decryption/authentication facility within a browser, wherein the encryption/decryption/authentication facility is adapted within browser to:

(i) authenticate user identification data of the associated user thereby enabling access to a private in the plurality of keys usable by the associated user, obtained from the at least one key storage medium; and (ii) encrypt/decrypt data, authenticate data, and/or authenticate sender, decrypt and/or verify the data or the sender for a recipient by accessing the associated private key or public key in the plurality of keys.

2. The encryption/decryption/authentication system as defined in claim 1 wherein for each associated user in the plurality of keys, a biometric standard is determined by measuring a selected feature of the associated user, which selected feature is stored to the at least one storage medium; and the encryption/decryption/authentication facility includes means for:

(a) measuring the selected feature of the associated user;

(b) determining if the selected feature as measured sufficiently corresponds to the biometric standard;

(c) granting use of the key to the associated user if the selected feature as measured sufficiently corresponds to the biometric standard; and (d) denying use of the key to the associated user if the selected feature as measured insufficiently corresponds to the biometric standard wherein the encryption/decryption/authentication facility encrypts and/or decrypts data using the associated private key or public key if the selected feature as measured sufficiently corresponds to the biometric standard.

3. The system as defined in claim 2, further comprising means for impeding viewing and copying of the associated private key and/or public key such that use of the key for encrypting/decrypting data, authenticating data, and/or authenticating a sender, decrypting and/or verifying data or the sender for a recipient, is grantable to the associated user without the associated user learning the key.

4. The system as defined in claim 1, wherein the encryption/decryption/authentication facility includes a key control facility for requiring the selected feature of the associated user to be measured and determined within the browser to sufficiently correspond to the biometric standard each time use of the key is granted to the associated user.

5. The system as defined in claim 4, wherein the encryption/decryption/authentication system includes a biometric device for measuring the selected feature of the associated user; and the encryption/decryption/authentication facility within the browser obtains the biometric standard and determines if the selected feature as measured by the biometric device sufficiently corresponds to the biometric standard.

6. The system as defined in claim 5, further comprising a plurality of biometric devices for measuring the selected feature of the associated user; and a plurality of remote computers, each remote computer in the plurality of remote computers being electronically linked to an associated biometric device and to the at least one key storage medium.

7. The system as defined in claim 6, wherein the at least one key storage medium includes at least one key storage server for storing a plurality of public and private keys and biometric standards, the at least one key storage server being electronically linked to the plurality of remote computers, wherein the plurality of public and private keys includes a plurality of private keys each having an associated public key, each of the plurality of keys being useable to decrypt data encrypted using the associated public or private key.

8. The system as defined in claim 7, wherein the plurality of private keys are stored to a private key storage server, the plurality of public keys are stored to a public key storage server, and the plurality of biometric standards are stored to a biometric standard storage server.

9. The system as defined in claim 1 wherein the encryption/decryption/authentication facility is adapted in the browser to selectively encrypt/decrypt data, authenticate data, and/or authenticate a sender, decrypt and/or verify data or the sender for a recipient.

10. The system as defined in claim 9, wherein the encryption/decryption/authentication facility is adapted to selectively process tagged data so as to within the browser encrypt/decrypt data, authenticate data, and/or authenticate a sender, decrypt and/or verify data or the sender for a recipient.

11. The system as defined in claim 2, wherein the encryption/decryption/authentication facility is adapted in the browser to selectively at the field level encrypt/decrypt data, authenticate data, and/or authenticate a sender, decrypt and/or verify data or the sender for a recipient.

12. The system as defined in claim 11, wherein the encryption/decryption/authentication facility is adapted in the browser to selectively encrypt/decrypt data, authenticate data, and/or authenticate a sender, decrypt and/or verify data or the sender for a recipient, at the form field level, database field level and/or file field level.

13. The system as defined in claim 1, wherein the encryption/decryption/authentication facility is adapted in the browser to sign and/or verify a digital signature associated with a web page.

14. The system as defined in claim 1 wherein the encryption/decryption/authentication facility is adapted to encrypt/decrypt one or more images.

15. A computer program product for use on a computer system for encrypting/decrypting data, authenticating data, and/or authenticating a sender, decrypting and/or verifying data or the sender for a recipient, the computer program product comprising:

(e) a computer usable medium; and (f) computer readable program code recorded on the computer useable medium, including:
  (i) program code that stores a plurality of keys to at least one key storage medium linked to the computer system, each key being useable by an associated user in a public key infrastructure to encrypt and decrypt data; and
  (ii) program code that within a browser linked to the computer system:
    (1) authenticates user identification data of the associated user thereby enabling access to a private key in the plurality of keys useable by the associated user, obtained from the at least one key storage medium; and
    (2) encrypts/decrypts data, authenticates data, and/or authenticates a sender, decrypts and/or verifies the data or the sender for a recipient, by accessing the associated private key or public key in the plurality of keys.

16. The computer program product as defined in claim 15, further including computer program code for instructing the computer system to, for each associated user, store a biometric standard determined by measuring a selected feature of the associated user.

17. The computer program product as defined in claim 16, further including computer program code for instructing the computer system to:
  (a) measure the selected feature of the associated user;
  (b) determine if the selected feature as measured sufficiently corresponds to the biometric standard;
  (c) grant use of the key to the associated user if the selected feature as measured sufficiently corresponds to the biometric standard; and
  (d) deny use of the key to the associated user if the selected feature as measured insufficiently corresponds to the biometric standard wherein the computer program code instructs the computer system to encrypts and/or decrypt data using the key if the selected feature as measured sufficiently corresponds to the biometric standard.

18. The computer program product as defined in claim 16, further including computer program code for instructing the computer system to impede viewing and copying of the associated public key and/or private key such that use of the associated public key and/or private key for encrypting/decrypting data, authenticating data, and/or authenticating a sender, decrypting and/or verifying data or the sender for a recipient, is grantable to the associated user without the associated user learning the key.

19. The computer program product as defined in claim 18, further including program code defining a key control facility for instructing the computer system to require the selected feature of the associated user to be measured and determined within the browser to sufficiently correspond to the biometric standard each time use of the key is granted to the associated user.

20. The computer program product as defined in claim 19, wherein the computer program code provides instructions to the computer system to:
  (a) receive the selected feature of the associated user measured by at least one biometric device; and
  (b) within the browser obtain the biometric standard and determine if the selected feature as measured by the at least one biometric device sufficiently corresponds to the biometric standard.

21. The computer program product as defined in claim 20, wherein the plurality of public and private keys includes a plurality of private keys each having an associated public key, each of the plurality of keys being useable to decrypt data encrypted using the associated public or private key.

22. The computer program product as defined in claim 21, wherein the plurality of private keys are stored to a private key storage server, the plurality of public keys are stored to a public key storage server, and the plurality of biometric standards are stored to a biometric standard storage server; and wherein the computer program product includes computer program code for linking the computer system to the private key storage server, the public key storage server, and the biometric standard storage server.

23. The computer program product as defined in claim 15, including computer program code for instructing the computer system in the browser to selectively encrypt/decrypt data, authenticate data, and/or authenticate a sender, decrypt and/or verify data or the sender for a recipient.

24. The computer program product as defined in claim 23, including computer program code for instructing the computer system in the browser to selectively process tagged data so as to within the browser encrypt/decrypt data, authenticate data, and/or authenticate a sender, decrypt and/or verify data or the sender for a recipient.

25. The computer program product as defined in claim 15, including computer program code for instructing the computer system in the browser to selectively at the field level encrypt/decrypt data, authenticate data, and/or authenticate a sender, decrypt and/or verify data or the sender for a recipient.

26. The computer program product as defined in claim 23, including computer program code for instructing the computer system in the browser to selectively encrypt/decrypt data, authenticate data, and/or authenticate a sender, decrypt and/or verify data or the sender for a recipient, at the form field level, database field level and/or file field level.

27. The computer program product as defined in claim 15, including computer program code for instructing the computer system in the browser to sign and/or verify a digital signature associated with a web page.

28. The computer program product as defined in claim 15, including computer program code for instructing the computer system in the browser to encrypt/decrypt one or more images.

29. An encryption/decryption/authentication system for encrypting/decrypting data, authenticating data, and/or authenticating a sender, decrypting and/or verifying data or the sender for a recipient, the encryption/decryption/authentication system comprising:
  (a) a key storage server for storing a plurality of keys, each key being useable by an associated user in a public key infrastructure to encrypt and decrypt data; and
  (b) a client computer accessible to the associated user, linked to the key storage server, and further linked to an encryption/decryption/authentication facility within a browser, wherein the encryption/decryption/authentication facility is adapted within the browser to:
    (i) authenticate user identification data of the associated user thereby enabling access to a private key in the plurality of keys useable by the associated user, obtained from the at least one key storage medium; and
    (ii) encrypt/decrypt data, authenticate data, and/or authenticate a sender, decrypt and/or verify the data or the sender for a recipient, by accessing the associated private key or public key in the plurality of keys.

30. An encryption/decryption/authentication system as defined in claim 29, wherein the encryption/decryption/ authentication facility obtains the user identification data by downloading an identification template associated with the associated user from the key storage server.

31. A method of encrypting/decrypting data, authenticating data, and/or authenticating a sender, decrypting and/or verifying data or the sender for a recipient in a browser, comprising the steps of:

(a) requesting at least one of encrypting/decrypting data, authenticating data, and/or authenticating a sender, decrypting and/or verifying data at a computer accessible to an associated user, the computer including an encryption/decryption/authentication facility adapted within a browser to:

(i) authenticate user identification data of the associated user thereby enabling access to a private key useable by the associated user, obtained from at least one key storage medium linked to the computer; and (ii) encrypt/decrypt data, authenticate data, and/or authenticate a sender, decrypt and/or verify the data or the sender for a recipient, by accessing the associated private key or public key of the associated user from the at least one key storage medium (b) making a request for user identification data and the private key of the associated user from the at least key storage medium;

(c) authenticating the user identification data by means of the encryption/decryption/authentication facility; and (d) encrypting/decrypting data, authenticating data, and/or authenticating a sender, decrypting and/or verifying data or the sender for a recipient in the browser by accessing the associated private key or public key of the associated user.

\* \* \* \* \*